(12) United States Patent
Shimura et al.

(10) Patent No.: US 11,806,673 B2
(45) Date of Patent: Nov. 7, 2023

(54) METHOD FOR FILTERING OIL

(71) Applicant: Toray Industries, Inc., Tokyo (JP)

(72) Inventors: Shun Shimura, Otsu (JP); Masayuki Hanakawa, Otsu (JP); Kenta Iwai, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/791,991

(22) PCT Filed: Jan. 25, 2021

(86) PCT No.: PCT/JP2021/002396
§ 371 (c)(1),
(2) Date: Jul. 11, 2022

(87) PCT Pub. No.: WO2021/153486
PCT Pub. Date: Aug. 5, 2021

(65) Prior Publication Data
US 2023/0046432 A1    Feb. 16, 2023

(30) Foreign Application Priority Data

Jan. 28, 2020 (JP) .................................. 2020-011495

(51) Int. Cl.
*B01D 65/06* (2006.01)
*B01D 61/10* (2006.01)
*B01D 61/14* (2006.01)
*B01D 63/02* (2006.01)
(Continued)

(52) U.S. Cl.
CPC .............. *B01D 65/06* (2013.01); *B01D 61/10* (2013.01); *B01D 61/14* (2013.01); *B01D 63/02* (2013.01); *B01D 69/00* (2013.01); *B01D 71/34* (2013.01)

(58) Field of Classification Search
None
See application file for complete search history.

(56) References Cited

U.S. PATENT DOCUMENTS

| 4,229,297 A | 10/1980 | Nohmi et al. |
| 4,545,940 A | 10/1985 | Mutoh et al. |
| 6,355,173 B1 * | 3/2002 | den Bieman .......... B01D 65/02 210/636 |

FOREIGN PATENT DOCUMENTS

| CN | 105722585 A | 6/2016 |
| JP | 5494167 A | 7/1979 |
| JP | 58194995 A | 11/1983 |

(Continued)

OTHER PUBLICATIONS

International Search Report and Written Opinion for International Application No. PCT/JP2021/002396, dated Mar. 23, 2021, 6 pages.
(Continued)

*Primary Examiner* — Krishnan S Menon
(74) *Attorney, Agent, or Firm* — RatnerPrestia (57) ABSTRACT

The present invention relates to a method of filtering an oil, the method including the following steps (A) and (B): (A) allowing a hydrophobic gas to permeate through a porous membrane including a hydrophobic polymer as a main component; and (B) allowing an oil to permeate through the porous membrane, in which the step (B) is performed after the hydrophobic gas that has permeated through the porous membrane is confirmed to have a relative humidity of 0 to 60% in the step (A).

16 Claims, 1 Drawing Sheet

(51) Int. Cl.
  *B01D 69/00* (2006.01)
  *B01D 71/34* (2006.01)

(56) References Cited

FOREIGN PATENT DOCUMENTS

| | | | |
|---|---|---|---|
| JP | 58194996 | A | 11/1983 |
| JP | 5920394 | A | 2/1984 |
| JP | 6017478 | B2 | 5/1985 |
| JP | 10244103 | A | 9/1998 |
| JP | 2007260671 | A | 10/2007 |

OTHER PUBLICATIONS

Chinese Office Action for Chinese Application No. 202180011567.7, dated Jul. 21, 2023 with translation, 19 pages.

\* cited by examiner

FIG. 1

FIG. 2

METHOD FOR FILTERING OIL

CROSS REFERENCE TO RELATED APPLICATIONS

This application is the U.S. National Phase application of PCT/JP2021/002396, filed Jan. 25, 2021, which claims priority to Japanese Patent Application No. 2020-011495, filed Jan. 28, 2020, the disclosures of these applications being incorporated herein by reference in their entireties for all purposes.

FIELD OF THE INVENTION

The present invention relates to a method of filtering an oil.

BACKGROUND OF THE INVENTION

In recent years, porous membranes such as microfiltration membranes and ultrafiltration membranes have been used in various fields such as water treatment fields such as purified water and wastewater treatment, medical fields such as blood purification, food industry fields, and oil and fat industry fields. A porous membrane in such a field is usually required to have high permeation performance in order to realize high processing efficiency. Further, in order to maintain a high processing efficiency for a long period of time, it is required to recover, by washing, the permeation performance gradually decreased by the filtration operation.

In the oil and fat industry, there has been known a method of washing a porous membrane between filtration operations in order to recover the permeation performance decreased by the filtration operation. For example, Patent Literature 1 discloses a technique in which a porous membrane formed of polyimide is used, and the porous membrane is washed with a dilute oil during a filtration operation to remove gum accumulated in the porous membrane. Patent Literature 2 discloses a technique in which a porous membrane formed of polyimide is used, the porous membrane is washed with an organic solvent during a filtration operation to remove gum accumulated in the porous membrane. Further, Patent Literature 3 discloses a technique in which a porous membrane formed of polyimide is used, the porous membrane is washed with a surfactant during a filtration operation to remove gum accumulated in the porous membrane.

PATENT LITERATURE

Patent Literature 1: JP-A-S58-194995
Patent Literature 2: JP-A-S58-194996
Patent Literature 3: JP-A-S59-20394

SUMMARY OF THE INVENTION

However, it is difficult to maintain the original permeation performance of the porous membrane by the technique focusing only on the removal of the gum.

Therefore, the present invention can provide a technique of maintaining excellent permeation performance by recovering the permeation performance by a simple method and continuing a filtration operation with a high processing capacity for a long period of time.

In order to solve the above problems, the present invention provides a method of filtering an oil, the method including: a step (A) of allowing a hydrophobic gas to permeate through a porous membrane including a hydrophobic polymer as a main component; and a step (B) of allowing an oil to permeate through the porous membrane, in which the step (B) is performed after the hydrophobic gas that has permeated through the porous membrane is confirmed to have a relative humidity of 0 to 60%.

According to the present invention, it is possible to provide a method of filtering an oil in which a decrease in permeation performance due to accumulation of moisture in a porous membrane is prevented and high permeation performance of the porous membrane is maintained by allowing a hydrophobic gas to permeate through a porous membrane containing a hydrophobic polymer as a main component.

DETAILED DESCRIPTION OF EMBODIMENTS OF THE INVENTION

Hereinafter, embodiments of the present invention will be described in detail with reference to the drawings, but the present invention is not limited to these embodiments. In the present description, "mass" has the same meaning as "weight". In addition, a space in contact with a porous membrane before an oil permeate through the porous membrane is referred to as a "primary side". A space in contact with the porous membrane after the oil permeate through the porous membrane is referred to as a "secondary side".

A method of filtering an oil of the present invention includes the following steps (A) and (B).

(A) Allowing a hydrophobic gas to permeate through a porous membrane including a hydrophobic polymer as a main component (B) Allowing an oil to permeate through the porous membrane It is necessary that the step (B) is performed after the hydrophobic gas that has permeated through the porous membrane is confirmed to have a relative humidity of 0 to 60%.

When water is present in pores of the porous membrane, an extremely high pressure is required for the oil to push away the water, and the oil substantially cannot permeate through the pores in which water is present. Since plants, which are sources of many oils, contain moisture, moisture gradually accumulates in the pores of the porous membrane during an oil filtration process. As a result, the number of the pores in the porous membrane through which an oil can permeate are reduced, and the permeation performance of the porous membrane decreases. Since the main component of the porous membrane is a hydrophobic polymer, the porous membrane has low affinity with water, so that moisture is less likely to accumulate in the porous membrane, and high permeation performance can be maintained over a long period of time. A contact angle of the porous membrane with water can serve as an index of the affinity with water. In order to prevent accumulation of water in the porous membrane, the contact angle of the porous membrane with water is preferably 65° to 130°, more preferably 70° to 120°, and still more preferably 70° to 100°. The contact angle can be measured by a static droplet method using a commercially available contact angle meter. Furthermore, since the main component of the porous membrane is a hydrophobic polymer, the porous membrane has high affinity with an oil and can exhibit high permeation performance.

The hydrophobic gas refers to an inert gas such as air, nitrogen, or carbon dioxide. A gas that is not a hydrophobic gas is a hydrophilic gas such as water vapor having a relative humidity of 100%. The relative humidity can be measured using a generally commercially available hygrometer. By allowing the hydrophobic gas to permeate through the porous membrane, the content of moisture accumulated in the porous membrane can be reduced, so that the permeation performance can be recovered, and the oil can be filtered while maintaining the high permeation performance of the porous membrane. The relative humidity of the hydrophobic gas before permeating through the porous membrane is preferably 0 to 60%, more preferably 0 to 40%, and still more preferably 0 to 30%. The relative humidity can be measured using a generally commercially available hygrometer.

In order to confirm that the content of the moisture accumulated in the porous membrane has been sufficiently reduced, it is necessary that the step (B) is performed after the hydrophobic gas that has permeated through the porous membrane is confirmed to have a relative humidity of 0 to 60%. The relative humidity of the hydrophobic gas that has permeated through the porous membrane can be confirmed by measurement using a generally commercially available hygrometer. The relative humidity of the hydrophobic gas that has permeated through the porous membrane is more preferably 0 to 40%, and still more preferably 0 to 30%.

In step (B), the filtration method may be a dead end filtration method in which an all amount of the oil supplied to the porous membrane is allowed to permeate through the porous membrane, or may be a cross-flow filtration method in which a part of the oil supplied to the porous membrane is allowed to permeate through the porous membrane and the oil that has not permeated through the porous membrane is allowed to flow in a direction orthogonal to a direction in which the oil permeates. When the dead end filtration method is employed, it is possible to reduce the energy for flowing the oil to a low level. When the cross-flow filtration method is employed, it is possible to allow the oil to permeate through the porous membrane while washing the porous membrane with a shearing force of the cross-flow, and thus it is easy to maintain high permeation performance of the porous membrane.

When step (A) includes the following step (A-1), the content of the moisture in the porous membrane can be easily reduced in a short time, which is preferable.

(A-1) Allowing a hydrophobic gas to permeate through the porous membrane at 5 $m^3/m^2/h$ to 80 $m^3/m^2/h$ in terms of 50 kPa in a direction in which the oil permeates through the porous membrane In step (A), when the moisture is accumulated in the porous membrane, the permeation flux of the hydrophobic gas is extremely small, but the content of the moisture in the porous membrane is reduced by continuously supplying the hydrophobic gas, and the permeation flux of the hydrophobic gas gradually increases. The permeation flux of the hydrophobic gas in step (A-1) is preferably 5 $m^3/m^2/h$ to 80 $m^3/m^2/h$ in terms of 50 kPa, more preferably 10 $m^3/m^2/h$ to 70 $m^3/m^2/h$ in terms of 50 kPa, and still more preferably 38 $m^3/m^2/h$ to 60 $m^3/m^2/h$ in terms of 50 kPa, because it is easy to confirm that the content of the moisture can be reduced to allow the oil to permeate through. The permeation flux of the hydrophobic gas can be determined by dividing a flow rate at which the hydrophobic gas permeate through the porous membrane from a primary side to a secondary side by an area of the porous membrane on the primary side. Further, assuming that the permeation flow rate is proportional to a pressure, the permeation flow rate can be appropriately converted based on a measured pressure.

When step (A) includes the following step (A-2), the content of the moisture in the porous membrane can be easily reduced in a short time, which is preferable.

(A-2) Allowing the hydrophobic gas to permeate through the porous membrane with a permeation flux of 5 $m^3/m^2/h$ to 80 $m^3/m^2/h$ in terms of 50 kPa in a direction opposite to the direction in which the oil permeates the porous membrane Since a large amount of impurities such as moisture and gum contained in the oil are likely to be accumulated on the primary side of the porous membrane, the hydrophobic gas is allowed to permeate through in a direction opposite to the direction in which the oil is allowed to permeate through the porous membrane, that is, from the secondary side to the primary side, so that the impurities such as moisture and gum are likely to be removed from the porous membrane, which is preferable. As the content of the moisture in the porous membrane decreases, the permeation flux of the hydrophobic gas in step (A-2) increases. The permeation flux is preferably 5 $m^3/m^2/h$ to 80 $m^3/m^2/h$ in terms of 50 kPa, more preferably 10 $m^3/m^2/h$ to 70 $m^3/m^2/h$ in terms of 50 kPa, and even more preferably 30 $m^3/m^2/h$ to 60 $m^3/m^2/h$ in terms of 50 kPa, because it is easy to confirm that the content of the moisture can be reduced to allow the oil to permeate through. The permeation flux of the hydrophobic gas can be determined by dividing a flow rate at which the hydrophobic gas permeate through the porous membrane from the secondary side to the primary side by an area of the porous membrane on the secondary side.

When step (A) includes the following step (A-3), the content of the moisture in the porous membrane can be easily reduced in a short time, which is preferable.

(A-3) Allowing the hydrophobic gas to flow at a flow rate of 0.1 $m^3/m^2/s$ to 10 $m^3/m^2/s$ in a direction parallel to the porous membrane on the primary side of the porous membrane where the oil permeate through Since a large amount of impurities such as water and gum contained in the oil are likely to be accumulated on the primary side of the porous membrane, the hydrophobic gas is allowed to flow on the primary side of the porous membrane in a direction parallel to the porous membrane, so that the impurities such as moisture and gum are likely to be effectively removed from the porous membrane by a shearing force of the hydrophobic gas, which is preferable. The flow rate of the hydrophobic gas in step (A-3) is preferably 0.1 $m^3/m^2/s$ to 10 $m^3/m^2/s$, more preferably 1 $m^3/m^2/s$ to 10 $m^3/m^2/s$, and still more preferably 3 $m^3/m^2/s$ to 10 $m^3/m^2/s$. The flow rate of the hydrophobic gas can be determined by dividing a flow rate of the hydrophobic gas flowing in the direction parallel to the porous membrane by a flow path area of gas in the direction orthogonal to the porous membrane in the space on the primary side of the porous membrane.

When step A includes the following step (A-4), the content of the moisture in the porous membrane can be easily reduced in a short time, which is preferable.

(A-4) Allowing a mixed phase flow of a hydrophobic gas and a cleaning liquid to flow at a flow rate of 0.1 $m^3/m^2/s$ to 10 $m^3/m^2/s$ in the direction parallel to the porous membrane on the primary side of the porous membrane where the oil permeate through Since a large amount of impurities such as water and gum contained in the oil are likely to be accumulated on the primary side of the porous membrane, the mixed phase flow of the hydrophobic gas and the cleaning liquid is allowed to flow on the primary side of the porous membrane in the direction parallel to the porous membrane, so that the impurities such as moisture and gum are likely to be effectively removed from the porous membrane by a shearing force of the mixed phase flow, which is preferable. An interface is present between the hydrophobic gas and the cleaning liquid in the mixed phase flow. When the interface comes into contact with the porous membrane, a large shearing force acts on the porous membrane, and moisture, gum, and the like are likely to be efficiently removed. The flow rate of the mixed phase flow in step (A-4) is preferably 0.1 $m^3/m^2/s$ to 10 $m^3/m^2/s$, more preferably 1 $m^3/m^2/s$ to 10 $m^3/m^2/s$, and still more preferably 3 $m^3/m^2/s$ to 10 $m^3/m^2/s$. The flow rate of the mixed phase flow can be determined by dividing a flow rate of the mixed phase flow flowing in the direction parallel to the porous membrane by a flow path area of the mixed phase flow in the direction orthogonal to the porous membrane in the space on the primary side of the porous membrane. The cleaning liquid used here may be a liquid being incompatible with water, and is preferably an oil, an organic solvent, or the like. As the organic solvent, alcohols and ketones are preferable because they can be easily removed from the porous membrane after washing. Hydrocarbons such as hexane are preferable because they can easily remove a gum. When an oil used for filtration is used, special equipment is not necessary, which is preferable.

When performing the oil filtration for a long period of time, steps (A) or (A)' and (B) are preferably repeated a plurality of times, so that the filtration can be easily continued while appropriately recovering the decrease in the permeation performance of the porous membrane. Step (A) or (A)' may include a plurality of steps (A-1) to (A-4) in any order, or may include steps other than steps (A-1) to (A-4). In addition, by performing step (A) or (A)' even after the porous membrane is assembled as a module or an element, it is possible to prevent water from being difficult to remove due to the presence of water for a long period of time during storage of the porous membrane.

When step (A) or (A)' after step (B) further includes step (A-5) in addition to steps (A-1) to (A-4), the content of the moisture in the porous membrane can be easily reduced in a short time, which is preferable.

(A-5) Allowing the cleaning liquid to permeate through the porous membrane with a permeation flux of 0.05 $m^3/m^2/h$ to 5.0 $m^3/m^2/h$ in terms of 50 kPa in the direction in which the oil permeate through the porous membrane The permeation flux of the cleaning liquid in step (A-5) is preferably 0.05 $m^3/m^2/h$ to 5.0 $m^3/m^2/h$ in terms of 50 kPa, more preferably 0.1 $m^3/m^2/h$ to 3.0 $m^3/m^2/h$ in terms of 50 kPa, and still more preferably 0.2 $m^3/m^2/h$ to 2.0 $m^3/m^2/h$ in terms of 50 kPa.

When step (A) or (A)' after step (B) further includes step (A-6) in addition to steps (A-1) to (A-4), the content of the moisture in the porous membrane can be easily reduced in a short time, which is preferable.

(A-6) Allowing the cleaning liquid to permeate through the porous membrane with a permeation flux of 0.05 $m^3/m^2/h$ to 5.0 $m^3/m^2/h$ in terms of 50 kPa in the direction opposite to the direction in which the oil permeate through the porous membrane Since a large amount of impurities such as moisture and gum contained in the oil are likely to be accumulated on the primary side of the porous membrane, the cleaning liquid is allowed to permeate through in the direction opposite to the direction in which the oil is allowed to permeate through the porous membrane, that is, from the secondary side to the primary side, so that the impurities such as moisture and gum are likely to be removed from the porous membrane, which is preferable. The permeation flux of the cleaning liquid in step (A-6) is preferably 0.05 $m^3/m^2/h$ to 5.0 $m^3/m^2/h$ in terms of 50 kPa, more preferably 0.1 $m^3/m^2/h$ to 3.0 $m^3/m^2/h$ in terms of 50 kPa, and still more preferably 0.2 $m^3/m^2/h$ to 2.0 $m^3/m^2/h$ in terms of 50 kPa.

When step (A) or (A)' after step (B) further includes step (A-7) in addition to steps (A-1) to (A-4), the content of the moisture in the porous membrane can be easily reduced in a short time, which is preferable.

(A-7) Allowing the cleaning liquid to flow at a flow rate of 0.1 $m^3/m^2/s$ to 10 $m^3/m^2/s$ in the direction parallel to the porous membrane on the primary side where the oil permeate through the porous membrane Since a large amount of impurities such as water and gum contained in the oil are likely to be accumulated on the primary side of the porous membrane, the cleaning liquid is allowed to flow on the primary side of the porous membrane in the direction parallel to the porous membrane, so that the impurities such as moisture and gum are likely to be removed from the porous membrane by the shearing force of the hydrophobic gas, which is preferable. The flow rate of the cleaning liquid in step (A-7) is preferably 0.1 $m^3/m^2/s$ to 10 $m^3/m^2/s$, more preferably 1 $m^3/m^2/s$ to 10 $m^3/m^2/s$, and still more preferably 3 $m^3/m^2/s$ to 10 $m^3/m^2/s$. The flow rate of the cleaning liquid can be determined by dividing a flow rate of the cleaning liquid flowing in the direction parallel to the porous membrane by a flow path area for cleaning in the direction orthogonal to the porous membrane in the space on the primary side of the porous membrane.

It is preferable that the porous membrane has an α-face and a β-face, a contact angle of the porous membrane with respect to water satisfies the following expression 1, the hydrophobic gas is allowed to permeate through the porous membrane from the α-face of the porous membrane in step (A) or (A)', and the oil is allowed to permeate through the porous membrane from the β-face of the porous membrane in step (B).

$$(\alpha\text{-face})-(\beta\text{-face}) \geq 10°$$　　　　Expression 1

By allowing the oil to permeate through from the β-face of the porous membrane having a small contact angle with respect to water, the moisture contained in the oil is retained in the vicinity of the β-face of the porous membrane, and it is easy to prevent the moisture from entering the inside of the porous membrane. In addition, by allowing the hydrophobic gas to permeate through from the α-face of the porous membrane having a large contact angle with respect to water, the moisture retained in the vicinity of the β-face of the porous membrane can be easily removed from the porous membrane. In order to prevent the entry of the moisture into the porous membrane, a value obtained by subtracting the contact angle of the β-face of the porous membrane with respect to water from the contact angle of the α-face of the porous membrane with respect to water is preferably 10° or more, more preferably 15° or more, still more preferably 20° or more, and most preferably 25° or more. It is preferable that the relationship between the contact angles of the α-face and the β-face of the porous membrane with respect to water is satisfied after step (B), because it is particularly easy to maintain high permeation performance.

The porous membrane may be composed of a single layer, or may be a composite porous membrane in which layers having different contact angles with respect to water are laminated. In the case of a composite porous membrane, expression 1 is easily satisfied, which is preferable. By laminating layers containing raw materials of different porous membranes, the contact angle with respect to water is likely to be different between the α-face and the β-face; by allowing the oil to permeate through the porous membrane from the β-face having a small contact angle, the moisture contained in the oil is likely to be retained in the vicinity of the β-face of the porous membrane; by allowing the hydrophobic gas to permeate through from the α-face having a large contact angle, the moisture is effectively removed; therefore, high permeation performance is likely to be maintained.

The method of filtering an oil of the present invention needs to include the following steps (A)' and (B).

(A)' Setting a moisture content of a porous membrane including a hydrophobic polymer as a main component to 0 to 35%

(B) Allowing an oil to permeate through the porous membrane

Since the main component of the porous membrane is a hydrophobic polymer, the porous membrane has low affinity with water, so that moisture is less likely to accumulate in the porous membrane, and high permeation performance can be maintained over a long period of time. A contact angle of the porous membrane with water can serve as an index of the affinity of the porous membrane with water. In order to prevent accumulation of moisture in the porous membrane, the contact angle of the porous membrane with water is preferably 65° to 130°, more preferably 70° to 120°, and still more preferably 70° to 100°. The contact angle can be measured by a static droplet method using a commercially available contact angle meter. Furthermore, since the main component of the porous membrane is a hydrophobic polymer, the porous membrane has high affinity with an oil and can exhibit high permeation performance.

Furthermore, by setting the moisture content of the porous membrane to 0 to 35%, a sufficient number of pores through which oil can permeate are present in the porous membrane, and high permeation performance can be exhibited. The moisture content is required to be 0 to 35%, preferably 0 to 15%, and more preferably 0 to 7%. As for the moisture content of the porous membrane, a Karl Fischer titration method or a drying weight loss method as described in JIS K 0068: 2001 is generally used. In the case of a porous membrane that does not contain a volatile component other than water in the porous membrane and is not thermally decomposed during measurement, the moisture content measured by the Karl Fischer titration method and the dry weight loss method can be regarded as the same.

Step (A)' of setting the moisture content of the porous membrane to 0 to 35% is achieved by a plurality of means such as exposing the porous membrane to the atmosphere, and is particularly easily achieved by bringing the porous membrane into contact with a volatile solvent and then exposing the porous membrane to the atmosphere. The moisture content of the porous membrane can be easily set to 0 to 35% in a short time by allowing the hydrophobic gas to permeate through the porous membrane, which is preferable.

Steps (A), (A)' and (B) can be performed at any temperature. A higher temperature in steps (A), (A)' is preferred because the saturated vapor content is larger and it is easier to remove the moisture from the porous membrane. A higher temperature in step (B) is preferred because the viscosity of the oil becomes smaller, making it easier to lower the resistance to permeate through the porous membrane and the resistance to flow on the primary side and the secondary side.

The hydrophobic polymer, which is a main component of the porous membrane, is preferably a polyvinylidene fluoride (PVDF)-based resin. The polyvinylidene fluoride-based resin refers to a homopolymer of vinylidene fluoride or a copolymer of vinylidene fluoride. Here, the copolymer of vinylidene fluoride refers to a polymer having a vinylidene fluoride residue structure. The polymer having a vinylidene fluoride residue structure is typically a copolymer of a vinylidene fluoride monomer and a fluorine-based monomer or the like other than the vinylidene fluoride monomer. Examples of such a fluorine-based monomer include vinyl fluoride, ethylene tetrafluoride, propylene hexafluoride, and ethylene trifluoride chloride. In the copolymer of vinylidene fluoride, ethylene or the like other than the fluorine-based monomer may be copolymerized to the extent that the effect of the present invention is not impaired.

The weight average molecular weight of the polyvinylidene fluoride-based resin is preferably 50000 to 1000000 Da because the permeation performance of the porous membrane decreases as the weight average molecular weight increases, and the separation performance of the porous membrane decreases as the weight average molecular weight decreases. When the porous membrane is subjected to chemical cleaning, the weight average molecular weight is preferably 100000 to 900000 Da, and more preferably 150000 to 800000 Da.

The porous membrane may contain a component other than the polymer as long as the effect of the present invention is not impaired. Examples of the component other than the polymer include a surfactant and inorganic particles. The main component of the porous membrane is preferably a polymer containing, as a main component, a polyvinylidene fluoride-based resin. In other words, the content of component other than the polymer in the porous membrane is preferably less than 50 mass %.

The porous membrane may contain a hydrophilic resin in addition to the hydrophobic polymer. When the porous membrane contains a hydrophilic resin, the contact angle of the porous membrane with respect to water can be controlled, and the affinity with moisture contained in the oil can be easily controlled to be high. Here, the term "hydrophilic resin" refers to a resin having a high affinity with water and being soluble in water, or a resin having a contact angle with water smaller than that of a polyvinylidene fluoride-based resin. Examples of the hydrophilic resin include polymers of cellulose esters such as cellulose acetate or cellulose acetate propionate, fatty acid vinyl esters, polyvinyl acetate, polyvinylpyrrolidone, ethylene oxide, propylene oxide or acrylic acid esters such as polymethylmethacrylate or methacrylic acid esters, and copolymers of these polymers.

Since the viscosity of oil is higher than that of water, the oil has a high flow resistance, and therefore, the energy required for the filtration operation is large. In order to reduce the energy required for the filtration operation, it is preferable not only to develop high permeation performance of the porous membrane, but also to reduce the resistance to flow through the primary side and the secondary side of the porous membrane. The shape of the porous membrane of the present invention is not particularly limited. However, in order to reduce the resistance to flow through the secondary side of the porous membrane, the porous membrane is preferably a hollow-fiber membrane having a secondary side flow path larger than that of a flat membrane. An external-pressure hollow-fiber membrane that allows an oil to permeate from the outer side to the inner side of the hollow-fiber is more preferable because the flow path having a high viscosity on the primary side can be expanded.

The pore diameter of the porous membrane may be uniform or non-uniform from the primary side toward the secondary side. When the pore diameter of the porous membrane on the primary side is smaller than the pore diameter of the porous membrane on the secondary side, it is difficult to incorporate moisture or gum into the porous membrane. Since the pore diameter of the porous membrane on the secondary side is large, high permeation performance is likely to be developed. More preferably, when the average surface pore diameter of the porous membrane on the primary side is 1 nm to 50 nm and the average surface pore diameter of the porous membrane on the secondary side is 100 nm to 1000 nm, high permeation performance is easily developed over a long period of time. When the average surface pore diameter of the porous membrane on the primary side is 1 nm to 50 nm, it is difficult to incorporate moisture or gum into the porous membrane. The average surface pore diameter of the porous membrane on the primary side is preferably 1 nm to 50 nm, more preferably 2 nm to 30 nm, and still more preferably 3 nm to 20 nm. In addition, when the average surface pore diameter on the secondary side is 100 nm to 1000 nm, high permeation performance is easily developed. Further, when the moisture content is reduced to 0 to 35%, a decrease in physical properties due to shrinkage or the like is easily prevented. The average surface pore diameter of the porous membrane can be calculated by observing the surface of the porous membrane with an electron microscope (hereinafter referred to as "SEM").

More specifically, the surface of the porous membrane is observed using an SEM at a magnification of 1000 to 100000 times, and an area of each of 300 randomly selected pores is measured. The diameter of each pore was calculated from the area of each pore as the pore diameter, on the assumption that the pore was a circle. The average of these diameters was used as the surface average pore diameter.

When the porous membrane is a composite porous membrane, the average surface pore diameters on the primary side and the secondary side can be easily controlled individually, which is preferable. At this time, when the average surface pore diameter on the secondary side is larger than the average surface pore diameter on the primary side, not only high permeation performance is easily developed, but also the porous layer on the secondary side acts as a support to easily prevent a decrease in physical properties, which is preferable.

The present invention relates to a method of filtering an oil. In particular, a method of filtering a vegetable oil using a plant as a raw material is preferable. The vegetable oil, which is a raw material for an edible oil, contains a large amount of glycerides, and also contains lecithin and vitamin E, which are called gum. Phospholipids such as lecithin and vitamin E are impurities to be removed in order to obtain purified an edible oil, and are also useful nutrients. The method of filtering an oil of the present invention can be suitably used in a step of separating a phospholipid from a vegetable oil. In order to efficiently separate the phospholipid, the porous membrane preferably has a surface pore diameter of 1 nm to 50 nm, more preferably 2 nm to 20 nm, and still more preferably 3 nm to 9 nm.

In step (A), it is preferable to confirm that the absolute humidity of the hydrophobic gas before permeating through the porous membrane is 0 to 20.0 $g/m^3$, more preferably 0 to 10.0 $g/m^3$, and still more preferably 0 to 5.0 $g/m^3$. The absolute humidity can be measured using a generally commercially available hygrometer. The absolute humidity of the hydrophobic gas that has permeated through the porous membrane can be confirmed by measurement using the generally commercially available hygrometer.

In step (A), when the absolute humidity of the hydrophobic gas that has permeated through the porous membrane is 0 to 20.0 $g/m^3$, it is easy to confirm that the moisture accumulated in the porous membrane is sufficiently reduced. The absolute humidity of the hydrophobic gas that has permeated through the porous membrane is preferably 0 to 10.0 $g/m^3$, and more preferably 0 to 5.0 $g/m^3$.

EXAMPLE

Hereinafter, the present invention will be specifically described with reference to Examples, but the present invention is not limited thereto.

Example 1

(i) Preparation of Porous Membrane 38 mass % of PVDF 1 (manufactured by Kureha Corporation; KF1300) and 62 mass % of γ-butyrolactone were mixed and dissolved at 160° C. to prepare a membrane-forming raw spinning solution. This membrane-forming raw spinning solution was ejected from a double tube mouthpiece while being accompanied with an 85 mass % γ-butyrolactone aqueous solution as a hollow portion forming liquid, and solidified in a cooling bath containing an 85 mass % γ-butyrolactone aqueous solution at a temperature of 20° C., which was placed below the mouthpiece by 30 mm, to prepare a porous layer serving as a hollow-fiber support having a spherical structure.

12 mass % of PVDF 2 (Solef 9007, manufactured by Solvay Specialty Chemicals), 7 mass % of cellulose acetate (LT-35, manufactured by Daicel Corporation), and 81 mass % of NMP were mixed and dissolved at 120° C. to prepare a coating polymer solution.

Next, the coating polymer solution was uniformly applied to the outer surface of the hollow-fiber support at 10 m/min (thickness: 50 µm). After one second from the coating of the support coated with the polymer solution, the support was immersed in distilled water at 15° C. for 10 seconds to be coagulated to form a porous layer having a three-dimensional network structure, thereby producing a composite porous membrane.

(ii) Average Surface Pore Diameter of Porous Membrane

The hollow-fiber porous membrane prepared as described in (i) above was immersed in ethanol for 2 hours, then immersed in water overnight, and taken out from the water. The porous membrane taken out was dried under reduced pressure at room temperature overnight. The surface of the porous membrane was observed at a magnification of 30000 to 100000 times using an SEM (S-5500; manufactured by HITACHI), and an area of each of 300 randomly selected pores was measured. The diameter of each pore was calculated from the area of each pore as a pore diameter, on the assumption that the pore was a circle, and the average of these diameters was used as the surface average pore diameter. The average pore diameter on the primary side (outer surface) having a three-dimensional network structure was 8 nm, and the average surface pore diameter on the secondary side (inner surface) was 200 nm.

(iii) Contact Angle of Porous Membrane

A miniature module through which a hydrophobic gas permeated, as shown in the following (iv), was disassembled, 1 µl of water droplet was brought into contact with the outer surface of a porous membrane taken out using an automatic contact angle meter (Drop master DM500, manufactured by Kyowa Interface Science Co., Ltd.), measurement was performed five times by a static droplet method, and the average value was calculated to be 65°.

(iv) Permeation of Hydrophobic Gas into Porous Membrane

Figure 1:
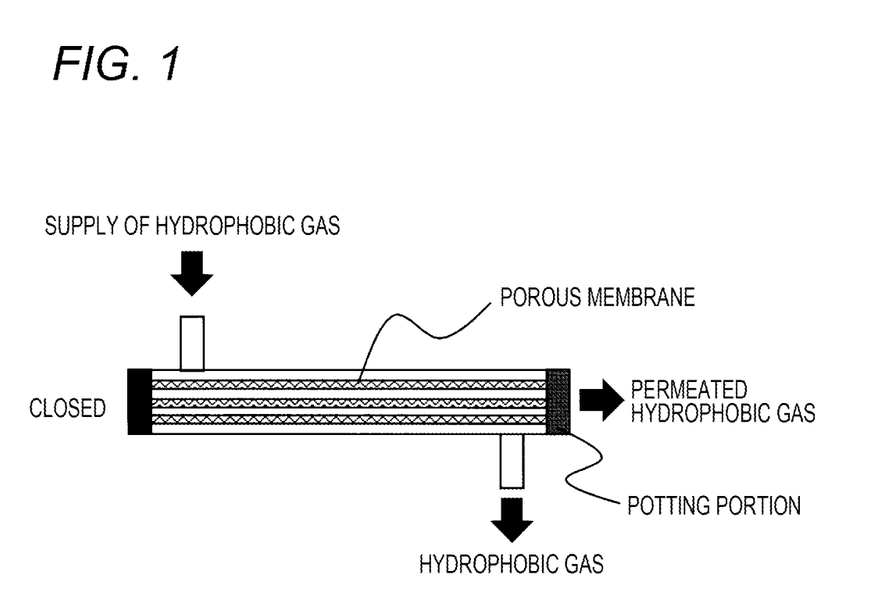
FIG. 1 is a process chart showing an example of a step of allowing a hydrophobic gas to permeate.

A miniature module having a length of 200 mm and composed of three hollow-fiber porous membranes produced as described in (i) above was produced. As shown in FIG. 1, dry air (relative humidity; 10%) was supplied to a primary side (outer surface) of the miniature module, and a hydrophobic gas was allowed to flow at 3.0 $m^3/m^2/s$ for 30 minutes in a direction parallel to the porous membrane, and a gas flow rate on a secondary side of the porous membrane was measured to determine a permeation flux after the gas flowing. As a result, the permeation flux was 9 $m^3/m^2/h$ in terms of 50 kPa. The relative humidity on the secondary side of the porous membrane after the gas flowing was 50%.

(v) Moisture Content of Porous Membrane

The miniature module through which a hydrophobic gas was allowed to permeate, as shown in (iv) above, was disassembled, and the weight of the porous membrane was measured with a precision electronic balance. Thereafter, the porous membrane was immersed in ethanol for 2 hours, then immersed in water overnight, and taken out from the water. The porous membrane taken out was dried under reduced pressure at room temperature overnight, and the weight was measured with a precision electronic balance. A difference in weight between before and after drying under reduced pressure was divided by the weight of the porous membrane containing moisture, and the moisture content calculated as a percentage was 26%.

(vi) Permeation of Oil into Porous Membrane

Figure 2:
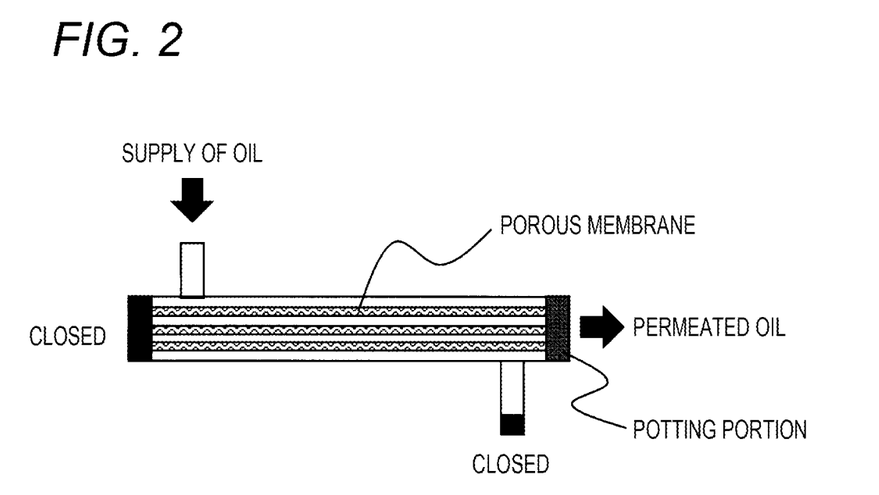
FIG. 2 is a process chart showing an example of a step of allowing an oil to permeate.

In the miniature module through which a hydrophobic gas was allowed to permeate, as shown in (iv) above, an edible rapeseed oil (manufactured by Nisshin OILLIO Group, Ltd.; first squeezed canola oil) was supplied to the primary side of the miniature module as shown in FIG. 2, and the oil was allowed to permeate through the porous membrane for 6 minutes. The weight of the oil that has permeated to the secondary side of the porous membrane was measured to determine a permeation flux of the oil. As a result, the permeation flux of the oil was 1.1 $L/m^2/h$ in terms of 100 kPa.

Example 2

(i) Preparation of Porous Membrane

The porous membrane prepared in Example 1 (i) was immersed in a 30 mass % glycerin aqueous solution for 1 hour and air-dried.

(iii) Contact Angle of Porous Membrane

A miniature module through which a hydrophobic gas permeated, as shown in the following (iv), was disassembled, 1 µl of water droplet was brought into contact with the outer surface of a porous membrane taken out, the measurement was performed five times by a static droplet method, and the average value thereof was 66°.

(iv) Permeation of Hydrophobic Gas into Porous Membrane

A miniature module was produced in the same manner as in Example 1. As shown in FIG. 1, dry air (relative humidity: 10%) was supplied to a primary side of the miniature module, the hydrophobic gas was allowed to flow at a flow rate of 3.0 $m^3/m^2/s$ in a direction parallel to the porous membrane, and a gas flow rate on the secondary side of the porous membrane was immediately measured to determine a permeation flux after the gas flowing. As a result, the permeation flux was 9 $m^3/m^2/h$ in terms of 50 kPa. The relative humidity on the secondary side of the porous membrane after the gas flowing was 55%.

(v) Moisture Content of Porous Membrane

The moisture content was calculated in the same manner as in Example 1 and was 31%.

(vi) Permeation of Oil into Porous Membrane

The permeation flux of the oil was determined in the same manner as in Example 1. As a result, the permeation flux was 1.0 $L/m^2/h$ in terms of 100 kPa.

Example 3

(iii) Contact Angle of Porous Membrane

A miniature module through which the hydrophobic gas permeated, as shown in the following (iv), was disassembled, 1 µl of water droplet was brought into contact with the outer surface of a porous membrane taken out, the measurement was performed five times by a static droplet method, and the average value was 74°.

(iv) Permeation of Hydrophobic Gas into Porous Membrane

A miniature module was produced in the same manner as in Example 1 by using the porous membrane produced in Example 1 (i). As shown in FIG. 1, dry air (relative humidity: 10%) was supplied to a primary side of the miniature module, the hydrophobic gas was allowed to flow at 3.0 $m^3/m^2/s$ in a direction parallel to the porous membrane for 60 minutes, and a gas flow rate on the secondary side of the porous membrane was measured to determine a permeation flux after the gas flowing. As a result, the permeation flux was 38 $m^3/m^2/h$ in terms of 50 kPa. The relative humidity on the secondary side of the porous membrane after the gas flowing was 15%.

(v) Moisture Content of Porous Membrane

The moisture content was calculated in the same manner as in Example 1 and was 0.2%.

(vi) Permeation of Oil into Porous Membrane

The permeation flux of the oil was determined in the same manner as in Example 1. As a result, the permeation flux was 2.0 $L/m^2/h$ in terms of 100 kPa.

Example 4

(i) Preparation of Porous Membrane

A porous membrane was produced in the same manner as in Example 1 except that 20 mass % of PVDF 3 (Kynar 710, manufactured by Arkema) and 80 mass % of NMP were mixed and dissolved at 120° C. to prepare a coating polymer solution.

(ii) Average Surface Pore Diameter of Porous Membrane

The average surface pore diameter of the outer surface was determined in the same manner as in Example 1, and was 32 nm.

(iii) Contact Angle of Porous Membrane

A miniature module through which the hydrophobic gas permeated, as shown in the following (iv), was disassembled, 1 µl of water droplet was brought into contact with the outer surface of a porous membrane taken out, the measurement was performed five times by a static droplet method, and the average value thereof was 103°.

(iv) Permeation of Hydrophobic Gas into Porous Membrane

A miniature module was produced in the same manner as in Example 1 by using the porous membrane produced in (i) above. As shown in FIG. 1, dry air (relative humidity: 10%) was supplied to a primary side of the miniature module, the hydrophobic gas was allowed to flow at 3.0 $m^3/m^2/s$ in a direction parallel to the porous membrane for 60 minutes, and a gas flow rate on the secondary side of the porous membrane was measured to determine a permeation flux after the gas flowing. As a result, the permeation flux was 35 m$^3$/m$^2$/h in terms of 50 kPa. The relative humidity on the secondary side of the porous membrane after the gas flowing was 12%.

(v) Moisture Content of Porous Membrane

The moisture content was calculated in the same manner as in Example 1, and was 0.1%.

(vi) Permeation of Oil into Porous Membrane

The permeation flux of the oil was determined in the same manner as in Example 1. As a result, the permeation flux was 1.4 L/m$^2$/h in terms of 100 kPa.

Example 5

(i) Preparation of Porous Membrane A porous membrane was produced in the same manner as in Example 1 except that PVDF 4 (Kynar 710, manufactured by Arkema) was used instead of PVDF 2 (Solef 9007, manufactured by Solvay Specialty Chemicals) in a coating polymer solution.

(ii) Average Surface Pore Diameter of Porous Membrane

The average surface pore diameter of the outer surface was determined in the same manner as in Example 1, and was 20 nm.

(iii) Contact Angle of Porous Membrane

A miniature module through which the hydrophobic gas permeated, as shown in the following (iv), was disassembled, 1 µl of water droplet was brought into contact with the outer surface of a porous membrane taken out, the measurement was performed five times by a static droplet method, and the average value thereof was 76°.

(iv) Permeation of Hydrophobic Gas into Porous Membrane

A miniature module was produced in the same manner as in Example 1 by using the porous membrane produced in (i) above. As shown in FIG. 1, dry air (relative humidity: 10%) was supplied to a primary side of the miniature module, the hydrophobic gas was allowed to flow at 3.0 m$^3$/m$^2$/s in a direction parallel to the porous membrane for 60 minutes, and a gas flow rate on the secondary side of the porous membrane was measured to determine a permeation flux after the gas flowing. As a result, the permeation flux was 54 m$^3$/m$^2$/h in terms of 50 kPa. The relative humidity on the secondary side of the porous membrane after the gas flowing was 14%.

(v) Moisture Content of Porous Membrane

The moisture content was calculated in the same manner as in Example 1 and was 0.2%.

(vi) Permeation of Oil into Porous Membrane

The permeation flux of the oil was determined in the same manner as in Example 1. As a result, the permeation flux was 2.9 L/m$^2$/h in terms of 100 kPa.

Example 6

When the filtration of the oil was continued in Example 3, the permeation flux of the oil gradually decreased. When the permeation flux of the oil reached 1.0 L/m$^2$/h (initial ratio: 0.5), filtration was stopped and the following operation was performed.

(iii) Contact Angle of Porous Membrane

A miniature module through which the hydrophobic gas permeated, as shown in the following (iv), was disassembled, 1 µl of water droplet was brought into contact with the outer surface (β-face) of a porous membrane taken out, the measurement was performed five times by a static droplet method, and the average value thereof was calculated to be 74°. In addition, 1 µl of water droplet was brought into contact with the inner surface (α-face) of the porous membrane, the measurement was performed five times by a static droplet method, and the average value thereof was calculated to be 103°.

(iv) Permeation of Hydrophobic Gas into Porous Membrane

Ethanol was enclosed in the miniature module, and immersed therein for 2 hours. Ethanol was then discharged from the miniature module, and dry air (relative humidity: 10%) was supplied to the secondary side (inner surface, α-face) of the miniature module, and allowed to permeate through the miniature module for 30 minutes in a direction opposite to a direction in which the oil was allowed to permeate through. A gas flow rate on the primary side of the porous membrane was measured to determine a permeation flux after the gas flowing. As a result, the permeation flux was 35 m$^3$/m$^2$/h in terms of 50 kPa. The relative humidity on the primary side of the porous membrane after the gas flowing was 13%.

(v) Moisture Content of Porous Membrane

The moisture content was calculated in the same manner as in Example 1 and was 0.2%.

(vi) Permeation of Oil into Porous Membrane

As in Example 1, the oil was allowed to permeate from the outer surface (β-face), and a permeation flux of the oil was determined. As a result, the permeation flux was 1.7 L/m$^2$/h in terms of 100 kPa.

Example 7

When the filtration of the oil was continued in Example 3, the permeation flux of the oil gradually decreased. When the permeation flux of the oil reached 1.0 L/m$^2$/h (initial ratio: 0.5), filtration was stopped and the following operation was performed.

(iii) Contact Angle of Porous Membrane

A miniature module through which the hydrophobic gas permeated, as shown in the following (iv), was disassembled, 1 µl of water droplet was brought into contact with the outer surface (β-face) of a porous membrane taken out, the measurement was performed five times by a static droplet method, and the average value thereof was calculated to be 64°. In addition, 1 µl of water droplet was brought into contact with the inner surface (α-face) of the porous membrane, the measurement was performed five times by a static droplet method, and the average value thereof was calculated to be 73°.

(iv) Permeation of Hydrophobic Gas into Porous Membrane

Ethanol was enclosed in the miniature module, and immersed therein for 2 hours. Ethanol was discharged from the miniature module, dry air (relative humidity: 10%) was supplied to the primary side (outer surface, β-face) of the miniature module, the hydrophobic gas was allowed to flow at 3.0 m$^3$/m$^2$/s in a direction parallel to the porous membrane for 3 minutes, and a gas flow rate on the secondary side of the porous membrane was measured to determine a permeation flux after the gas flowing. As a result, the permeation flux was 10 m$^3$/m$^2$/h in terms of 50 kPa. The relative humidity on the secondary side of the porous membrane after the gas flowing was 40%.

(v) Moisture Content of Porous Membrane

The moisture content was calculated in the same manner as in Example 1, and was 24%.

(vi) Permeation of Oil into Porous Membrane

As in Example 1, the oil was allowed to permeate from the outer surface (β-face), and a permeation flux of the oil was determined. As a result, the permeation flux was 1.2 L/m²/h in terms of 100 kPa.

Example 8

When the filtration of the oil was continued in Example 4, the permeation flux of the oil gradually decreased. When the permeation flux of the oil reached 0.7 L/m²/h (initial ratio: 0.5), filtration was stopped and the following operation was performed.

(iii) Contact Angle of Porous Membrane

A miniature module through which the hydrophobic gas permeated, as shown in the following (iv), was disassembled, 1 μl of water droplet was brought into contact with the outer surface (β-face) of a porous membrane taken out, the measurement was performed five times by a static droplet method, and the average value thereof was calculated to be 90°. In addition, 1 μl of water droplet was brought into contact with the inner surface (α-face) of the porous membrane, the measurement was performed five times by a static droplet method, and the average value thereof was calculated to be 90°.

(iv) Permeation of Hydrophobic Gas into Porous Membrane

Ethanol was enclosed in the miniature module, and immersed therein for 2 hours. Ethanol was discharged from the miniature module, and dry air (relative humidity: 10%) was supplied to the secondary side (inner surface, α-face) of the miniature module, and allowed to permeate through the miniature module for 30 minutes in a direction opposite to a direction in which the oil was allowed to permeate through. A gas flow rate on the primary side of the porous membrane was measured to determine a permeation flux after the gas flowing. As a result, the permeation flux was 26 m³/m²/h in terms of 50 kPa. The relative humidity on the primary side of the porous membrane after the gas flowing was 50%.

(v) Moisture Content of Porous Membrane

The moisture content was calculated in the same manner as in Example 1, and was 25%.

(vi) Permeation of Oil into Porous Membrane

As in Example 1, the oil was allowed to permeate from the outer surface (β-face), and a permeation flux of the oil was determined. As a result, the permeation flux was 1.0 L/m²/h in terms of 100 kPa.

Comparative Example 1

(vi) Permeation of Oil into Porous Membrane

Without allowing a hydrophobic gas to permeate through the miniature module prepared in Example 1, an edible rapeseed oil (manufactured by Nisshin OILLIO Group, Ltd.; first squeezed canola oil) was supplied to a primary side of the miniature module as shown in FIG. 2 as in Example 1 (vi), but no oil permeated through the porous membrane at all.

Example 9

(i) Preparation of Porous Membrane 38 mass % of PVDF 1 (manufactured by Kureha Corporation; KF1300) and 62 mass % of γ-butyrolactone were mixed and dissolved at 160° C. to prepare a membrane-forming raw spinning solution. This membrane-forming raw spinning solution was ejected from a double tube mouthpiece while being accompanied with an 85 mass % γ-butyrolactone aqueous solution as a hollow portion forming liquid, and solidified in a cooling bath containing an 85 mass % γ-butyrolactone aqueous solution at a temperature of 20° C., which was placed below the mouthpiece by 30 mm, to prepare a hollow-fiber support having a spherical structure.

12 mass % of PVDF 2 (Solef 9007, manufactured by Solvay Specialty Chemicals), 7 mass % of cellulose acetate (LT-35, manufactured by Daicel Corporation), and 81 mass % of NMP were mixed and dissolved at 120° C. to prepare a coating polymer solution.

Next, the coating polymer solution was uniformly applied to the outer surface of the hollow-fiber support at 10 m/min (thickness: 50 μm). After one second from the coating of the support coated with the polymer solution, the support was immersed in distilled water of 15° C. for 10 seconds to be coagulated to form a porous membrane having a three-dimensional network structure.

(ii) Average Surface Pore Diameter of Porous Membrane

The hollow-fiber porous membrane prepared as described in (i) above was immersed in ethanol for 2 hours, then immersed in water overnight, and taken out from the water. The porous membrane taken out was dried under reduced pressure at room temperature overnight. The surface of the porous membrane was observed at a magnification of 30000 to 100000 times using an SEM (S-5500; manufactured by HITACHI), and an area of each of 300 randomly selected pores was measured. The diameter of each pore was calculated from the area of each pore as a pore diameter, on the assumption that the pore was a circle, and the average of these diameters was used as the surface average pore diameter. The average pore diameter on the primary side (outer surface) having a three-dimensional network structure was 8 nm, and the average surface pore diameter on the secondary side (inner surface) was 200 nm.

(iii) Contact Angle of Porous Membrane

A miniature module through which a hydrophobic gas permeated, as shown in the following (iv), was disassembled, 1 μl of water droplet was brought into contact with the outer surface of a porous membrane taken out using an automatic contact angle meter (Drop master DM500, manufactured by Kyowa Interface Science Co., Ltd.), measurement was performed five times by a static droplet method, and the average value thereof was calculated to be 65°.

(iv) Permeation of Hydrophobic Gas into Porous Membrane

A miniature module having a length of 200 mm and composed of three hollow-fiber porous membranes produced as described in (i) above was produced. As shown in FIG. 1, dry air (absolute humidity; 2.3 g/m³, 25° C.) was supplied to a primary side of the miniature module, and the hydrophobic gas was allowed to flow at 3.0 m³/m²/s for 30 minutes in a direction parallel to the porous membrane, and a gas flow rate on a secondary side of the porous membrane was measured to determine a permeation flux after the gas flowing. As a result, the permeation flux was 9 m³/m²/h in terms of 50 kPa. The absolute humidity on the secondary side of the porous membrane after the gas flowing was 11.5 g/m³, and the temperature of the hydrophobic gas was 25° C. The absolute humidity and the temperature of the gas were measured by using an absolute hygrometer (TAA80, manufactured by Toplas Engineering Co., Ltd.).

(v) Moisture Content of Porous Membrane

The miniature module through which a hydrophobic gas permeated, as shown in (iv) above, was disassembled, and the weight of the porous membrane was measured with a precision electronic balance. Thereafter, the porous membrane was immersed in ethanol for 2 hours, then immersed in water overnight, and taken out from the water. The porous membrane taken out was dried under reduced pressure at room temperature overnight, and the weight was measured with a precision electronic balance. A difference in weight between before and after drying under reduced pressure was divided by the weight of the porous membrane containing moisture, and the moisture content calculated as a percentage was 26%.

(vi) Permeation of Oil into Porous Membrane

In the miniature module through which a hydrophobic gas permeated, as shown in (iv) above, an edible rapeseed oil (manufactured by Nisshin OILLIO Group, Ltd.; first squeezed canola oil) was supplied to the primary side of the miniature module as shown in FIG. 2, and the oil was allowed to permeate through the porous membrane for 6 minutes. The weight of the oil that has permeated to the secondary side of the porous membrane was measured to determine a permeation flux of the oil. As a result, the permeation flux of the oil was 1.1 L/m$^2$/h in terms of 100 kPa.

Example 10

(i) Preparation of Porous Membrane

The porous membrane prepared in Example 9 (i) was immersed in a 30 mass % glycerin aqueous solution for 1 hour and air-dried.

(iii) Contact Angle of Porous Membrane

A miniature module through which a hydrophobic gas permeated, as shown in the following (iv), was disassembled, 1 µl of water droplet was brought into contact with the outer surface of a porous membrane taken out, the measurement was performed five times by a static droplet method, and the average value thereof was calculated to be 66°.

(iv) Permeation of Hydrophobic Gas into Porous Membrane

A miniature module was produced in the same manner as in Example 9. As shown in FIG. 1, dry air (absolute humidity: 2.3 g/m$^3$, 25° C.) was supplied to a primary side of the miniature module, the hydrophobic gas was allowed to flow at 3.0 m$^3$/m$^2$/s in a direction parallel to the porous membrane, and a gas flow rate on the secondary side of the porous membrane was immediately measured to determine a permeation flux after the gas flowing. As a result, the permeation flux was 9 m$^3$/m$^2$/h in terms of 50 kPa. The absolute humidity on the secondary side of the porous membrane after the gas flowing was 12.7 g/m$^3$, and the temperature of the hydrophobic gas was 25° C.

(v) Moisture Content of Porous Membrane

The moisture content was calculated in the same manner as in Example 9, and was 31%.

(vi) Permeation of Oil into Porous Membrane

The permeation flux of the oil was determined in the same manner as in Example 9. As a result, the permeation flux was 1.0 L/m$^2$/h in terms of 100 kPa.

Example 11

(iii) Contact Angle of Porous Membrane

A miniature module through which a hydrophobic gas permeated, as shown in the following (iv), was disassembled, 1 µl of water droplet was brought into contact with the outer surface of a porous membrane taken out, the measurement was performed five times by a static droplet method, and the average value thereof was calculated to be 74°.

(iv) Permeation of Hydrophobic Gas into Porous Membrane

A miniature module was produced in the same manner as in Example 9 by using the porous membrane produced in Example 9 (i). As shown in FIG. 1, dry air (absolute humidity: 2.3 g/m$^3$, 25° C.) was supplied to a primary side of the miniature module, the hydrophobic gas was allowed to flow at 3.0 m$^3$/m$^2$/s for 60 minutes in a direction parallel to the porous membrane, and a gas flow rate on the secondary side of the porous membrane was measured to determine the permeation flux after gas flowing. As a result, the permeation flux was 38 m$^3$/m$^2$/h in terms of 50 kPa. The absolute humidity on the secondary side of the porous membrane after the gas flowing was 3.5 g/m$^3$, and the temperature of the hydrophobic gas was 25° C.

(v) Moisture Content of Porous Membrane

The moisture content was calculated in the same manner as in Example 9, and was 0.2%.

(vi) Permeation of Oil into Porous Membrane

The permeation flux of the oil was determined in the same manner as in Example 9. As a result, the permeation flux was 2.0 L/m$^2$/h in terms of 100 kPa.

Example 12

(i) Preparation of Porous Membrane

A porous membrane was produced in the same manner as in Example 9 except that 20 mass % of PVDF 3 (Kynar 710, manufactured by Arkema) and 80 mass % of NMP were mixed and dissolved at 120° C. to prepare a coating polymer solution.

(ii) Average Surface Pore Diameter of Porous Membrane

The average surface pore diameter of the outer surface was determined in the same manner as in Example 9 and was 32 nm.

(iii) Contact Angle of Porous Membrane

A miniature module through which a hydrophobic gas permeated, as shown in the following (iv), was disassembled, 1 µl of water droplet was brought into contact with the outer surface of a porous membrane taken out, the measurement was performed five times by a static droplet method, and the average value thereof was calculated to be 103°.

(iv) Permeation of Hydrophobic Gas into Porous Membrane

A miniature module was produced in the same manner as in Example 9 by using the porous membrane produced in (i) above. As shown in FIG. 1, dry air (absolute humidity: 2.3 g/m$^3$, 25° C.) was supplied to a primary side of the miniature module, the hydrophobic gas was allowed to flow at 3.0 m$^3$/m$^2$/s for 60 minutes in a direction parallel to the porous membrane, and a gas flow rate on the secondary side of the porous membrane was measured to determine the permeation flux after gas flowing. As a result, the permeation flux was 35 m$^3$/m$^2$/h in terms of 50 kPa. The absolute humidity on the secondary side of the porous membrane after the gas flowing was 2.8 g/m$^3$, and the temperature of the hydrophobic gas was 25° C.

(v) Moisture Content of Porous Membrane

The moisture content was calculated in the same manner as in Example 9, and was 0.1%.

(vi) Permeation of Oil into Porous Membrane

The permeation flux of the oil was determined in the same manner as in Example 9.

As a result, the permeation flux was 1.4 L/m$^2$/h in terms of 100 kPa.

Example 13

(i) Preparation of Porous Membrane

A porous membrane was produced in the same manner as in Example 9 except that PVDF 4 (Kynar 710, manufactured by Arkema) was used instead of PVDF 2 (Solef 9007, manufactured by Solvay Specialty Chemicals) in a coating polymer solution.

(ii) Average Surface Pore Diameter of Porous Membrane

The average surface pore diameter of the outer surface was determined in the same manner as in Example 9, and was 20 nm.

(iii) Contact Angle of Porous Membrane

A miniature module through which a hydrophobic gas permeated, as shown in the following (iv), was disassembled, 1 μl of water droplet was brought into contact with the outer surface of a porous membrane taken out, the measurement was performed five times by a static droplet method, and the average value thereof was calculated to be 76°.

(iv) Permeation of Hydrophobic Gas into Porous Membrane

A miniature module was produced in the same manner as in Example 9 by using the porous membrane produced in (i) above. As shown in FIG. 1, dry air (absolute humidity: 2.3 g/m$^3$, 25° C.) was supplied to a primary side of the miniature module, the hydrophobic gas was allowed to flow at 3.0 m$^3$/m$^2$/s for 60 minutes in a direction parallel to the porous membrane, and a gas flow rate on the secondary side of the porous membrane was measured to determine the permeation flux after gas flowing. As a result, the permeation flux was 54 m$^3$/m$^2$/h in terms of 50 kPa. The absolute humidity on the secondary side of the porous membrane after the gas flowing was 3.2 g/m$^3$, and the temperature of the hydrophobic gas was 25° C.

(v) Moisture Content of Porous Membrane

The moisture content was calculated in the same manner as in Example 9, and was 0.2%.

(vi) Permeation of Oil into Porous Membrane

The permeation flux of the oil was determined in the same manner as in Example 9. As a result, the permeation flux was 2.9 L/m$^2$/h in terms of 100 kPa.

TABLE 1

|  | Unit | Example 1 | Example 2 | Example 3 | Example 4 | Example 5 | Comparative Example 1 |
|---|---|---|---|---|---|---|---|
| Permeation flux of hydrophobic gas | m$^3$/m$^2$/h @ 50 kPa | 9 | 9 | 38 | 35 | 54 | — |
| Relative humidity of gas that has permeated through porous membrane | % | 50 | 55 | 15 | 12 | 14 | — |
| Moisture content of porous membrane | % | 26 | 31 | 0.2 | 0.1 | 0.2 | 52 |
| Contact angle of porous membrane | ° | 65 | 66 | 74 | 103 | 76 | — |
| Average surface pore diameter of porous membrane | nm | 8 | 8 | 8 | 32 | 20 | 8 |
| Permeation flux of oil | L/m$^2$/h @ 100 kPa | 1.1 | 1 | 2 | 1.4 | 2.9 | 0 |

TABLE 2

|  | Unit | Example 6 | Example 7 | Example 8 |
|---|---|---|---|---|
| Permeation flux of hydrophobic gas | m$^3$/m$^2$/h @ 50 kPa | 35 | 10 | 26 |
| Relative humidity of gas that has permeated through porous membrane | % | 13 | 40 | 50 |
| Moisture content of porous membrane | % | 0.2 | 24 | 25 |
| Contact angle of outer surface of porous membrane | ° | 74 | 64 | 90 |
| Contact angle of inner surface of porous membrane | ° | 103 | 73 | 90 |
| Average surface pore diameter of porous membrane | nm | 8 | 8 | 32 |
| Permeation flux of oil | L/m$^2$/h @ 100 kPa | 1.7 | 1.2 | 0.98 |

TABLE 3

|  | Unit | Example 9 | Example 10 | Example 11 | Example 12 | Example 13 |
|---|---|---|---|---|---|---|
| Permeation flux of hydrophobic gas | m$^3$/m$^2$/h @ 50 kPa | 9 | 9 | 38 | 35 | 54 |
| Gas temperature | ° C. | 25 | 25 | 25 | 25 | 25 |
| Absolute humidity of gas that has permeated through porous membrane | g/m$^3$ | 11.5 | 12.7 | 3.5 | 2.8 | 3.2 |
| Moisture content of porous membrane | % | 26 | 31 | 0.2 | 0.1 | 0.2 |
| Contact angle of porous membrane | ° | 65 | 66 | 74 | 103 | 76 |
| Average surface pore diameter of porous membrane | nm | 8 | 8 | 8 | 32 | 20 |
| Permeation flux of oil | L/m$^2$/h @ 100 kPa | 1.1 | 1 | 2 | 1.4 | 2.9 |

Although the present invention has been described in detail with reference to specific embodiments, it will be apparent to those skilled in the art that various changes and modifications can be made without departing from the spirit and scope of the present invention.

The invention claimed is:

1. A method of filtering an oil, the method comprising the following steps (A) and (B):
   (A) allowing a hydrophobic gas to permeate through a composite porous membrane comprising a hydrophobic polymer as a main component; and
   (B) allowing an oil to permeate through the composite porous membrane,
   wherein the step (B) is performed after the hydrophobic gas that has permeated through the composite porous membrane is confirmed to have a relative humidity of 0 to 60% in the step (A), and
   wherein the composite porous membrane has an α-face and a β-face, and after the step (A) and before the step (B), the composite porous membrane has a contact angle with respect to water of 65° to 130° and satisfies the following Expression 1, and the hydrophobic gas is allowed to permeate through the composite porous membrane from the α-face of the composite porous membrane in the step (A), and the oil is allowed to permeate through the composite porous membrane from the β-face of the composite porous membrane in the step (B)

$$(\alpha\text{-face}) - (\beta\text{-face}) \geq 10°$$  Expression 1.

2. A method of filtering an oil, the method comprising the following steps (A)' and (B):
   (A)' setting a moisture content of a composite porous membrane comprising a hydrophobic polymer as a main component to 0 to 35%; and
   (B) allowing an oil to permeate through the composite porous membrane,
   wherein the composite porous membrane has an α-face and a β-face, and after the step (A)' and before the step (B), the composite porous membrane has a contact angle with respect to water of 65° to 130° and satisfies the following Expression 1, and the hydrophobic gas is allowed to permeate through the composite porous membrane from the α-face of the composite porous membrane in the step (A)', and the oil is allowed to permeate through the composite porous membrane from the β-face of the composite porous membrane in the step (B)

$$(\alpha\text{-face}) - (\beta\text{-face}) \geq 10°$$  Expression 1.

3. The method of filtering an oil according to claim 2, wherein the moisture content of the composite porous membrane is set to 0 to 35% by allowing a hydrophobic gas to permeate through the composite porous membrane.

4. The method of filtering an oil according to claim 1, wherein the step (A) comprises the following step (A-1):
   (A-1) allowing a hydrophobic gas to permeate through the composite porous membrane at a permeation flux of 5 $m^3/m^2/h$ to 80 $m^3/m^2/h$ in terms of 50 kPa in a direction in which the oil permeates through the composite porous membrane.

5. The method of filtering an oil according to claim 1, wherein the step (A) comprises the following step (A-2):
   (A-2) allowing the hydrophobic gas to permeate through the composite porous membrane at a permeation flux of 5 $m^3/m^2/h$ to 80 $m^3/m^2/h$ in terms of 50 kPa in a direction opposite to the direction in which the oil permeates through the composite porous membrane.

6. The method of filtering an oil according to claim 1, wherein the step (A) comprises the following step (A-3):
   (A-3) allowing the hydrophobic gas to flow at a flow rate of 0.1 $m^3/m^2/s$ to 10 $m^3/m^2/s$ in a direction parallel to the composite porous membrane on a primary side of the composite porous membrane where the oil permeates through.

7. The method of filtering an oil according to claim 1, wherein the step (A) comprises the following step (A-4):
   (A-4) allowing a mixed phase flow of the hydrophobic gas and the oil to flow at a flow rate of 0.1 $m^3/m^2/s$ to 10 $m^3/m^2/s$ on the primary side of the composite porous membrane where the oil permeates through.

8. The method of filtering an oil according to claim 1, wherein the composite porous membrane satisfies Expression 1 after the step (B).

9. The method of filtering an oil according to claim 1, wherein the oil is a vegetable oil.

10. The method of filtering an oil according to claim 1, wherein the hydrophobic polymer is a polyvinylidene fluoride-based resin.

11. The method of filtering an oil according to claim 1, wherein the composite porous membrane is a hollow-fiber membrane.

12. The method of filtering an oil according to claim 1, wherein the composite porous membrane has an average surface pore diameter of 1 nm to 50 nm.

13. A method of filtering an oil, the method comprising the following steps (A) and (B):
   (A) allowing a hydrophobic gas to permeate through a composite porous membrane comprising a hydrophobic polymer as a main component; and
   (B) allowing an oil to permeate through the composite porous membrane,
   wherein the step (B) is performed after the hydrophobic gas that has permeated through the composite porous membrane is confirmed to have an absolute humidity of 0 to 20.0 $g/m^3$ in the step (A), and
   wherein the composite porous membrane has an α-face and a β-face, and after the step (A) and before the step (B), the composite porous membrane has a contact angle with respect to water being 65° to 130° and satisfying the following Expression 1, and the hydrophobic gas is allowed to permeate through the composite porous membrane from the α-face of the composite porous membrane in the step (A), and the oil is allowed to permeate through the composite porous membrane from the β-face of the composite porous membrane in the step (B)

$$(\alpha\text{-face}) - (\beta\text{-face}) \geq 10°$$  Expression 1.

14. The method of filtering an oil according to claim 1, wherein the composite porous membrane comprises a hydrophilic resin.

15. The method of filtering an oil according to claim 2, wherein the composite porous membrane comprises a hydrophilic resin.

16. The method of filtering an oil according to claim 13, wherein the composite porous membrane comprises a hydrophilic resin.

* * * * *